(12) United States Patent
Farhan et al.

(10) Patent No.: US 10,185,509 B1
(45) Date of Patent: Jan. 22, 2019

(54) SECURE STORAGE DEVICE SANITIZATION

(71) Applicant: Amazon Technologies, Inc., Seattle, WA (US)

(72) Inventors: Munif M. Farhan, Clyde Hill, WA (US); Jaime Ismael Rangel Martinez, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 41 days.

(21) Appl. No.: 15/611,525

(22) Filed: Jun. 1, 2017

(51) Int. Cl.
*G06F 12/00* (2006.01)
*G06F 3/06* (2006.01)
*G06F 12/14* (2006.01)

(52) U.S. Cl.
CPC .......... *G06F 3/0623* (2013.01); *G06F 3/0652* (2013.01); *G06F 3/0674* (2013.01); *G06F 12/14* (2013.01); *G06F 2221/2143* (2013.01)

(58) Field of Classification Search
None
See application file for complete search history.

(56) References Cited

U.S. PATENT DOCUMENTS

| | | | | |
|---|---|---|---|---|
| 9,223,612 | B1* | 12/2015 | Feldman | G06F 9/465 |
| 9,467,288 | B2* | 10/2016 | Obukhov | G06F 21/6209 |
| 9,972,375 | B2* | 5/2018 | Parks | G06F 3/0619 |
| 2006/0143476 | A1* | 6/2006 | McGovern | G06F 21/6218 |
| | | | | 713/191 |
| 2015/0002900 | A1* | 1/2015 | Cochran | G06K 15/1828 |
| | | | | 358/1.16 |
| 2016/0013944 | A1* | 1/2016 | Offenberg | G06F 21/64 |
| | | | | 713/176 |

OTHER PUBLICATIONS

Kiseel et al., "Guidelines for Media Sanitization," *NIST Special Publication 800-88, Revision 1, U.S. Department of Commerce*, downloaded from http://dx.doi.org/10.6028/NIST.SP.800-88r1, 64pp. (Dec. 2014).

* cited by examiner

*Primary Examiner* — John A Lane
(74) *Attorney, Agent, or Firm* — Klarquist Sparkman, LLP

(57) ABSTRACT

Technologies are provided for secure sanitization of a storage device. A storage device can be configured to support an operational mode, into which the storage device is placed by default, and in which requests to cryptographically erase the storage device are rejected. The storage device can support a separate sanitization mode in which a request to cryptographically erase the storage device will be processed. Access to the sanitization mode can be restricted to trusted sources (such as a boot firmware of a computer connected to the storage device). The storage device can be configured to reject a command to place the storage device in the sanitization mode, unless the command is received during an initialization of the storage device. In at least some embodiments, the storage device can reject data access commands while it is in the sanitization mode.

20 Claims, 9 Drawing Sheets

SECURE STORAGE DEVICE SANITIZATION

BACKGROUND

Storage device manufacturers continue to develop new ways to increase the capacity of storage devices. However, for many such storage devices write access performance is not increasing at a rate that is commensurate with the increased storage capacity. As a result, in at least some cases, the amount of time required to sanitize a storage device, by making unreadable (e.g., erasing) all data stored on the storage device, is increasing. Some storage devices (such as Self-Encrypting Drives) are configured to encrypt data using cryptographic keys before storing the data. Such storage devices decrypt the data using the cryptographic keys before transmitting it to a requestor. At least some such storage devices support a cryptographic erase feature, wherein encrypted data stored in a storage device is rendered unreadable by erasing the cryptographic key used to decrypt the data. In at least some cases, such a storage device can be sanitized by erasing the cryptographic key instead of erasing all data stored on the storage device.

DETAILED DESCRIPTION

Figure 1A:
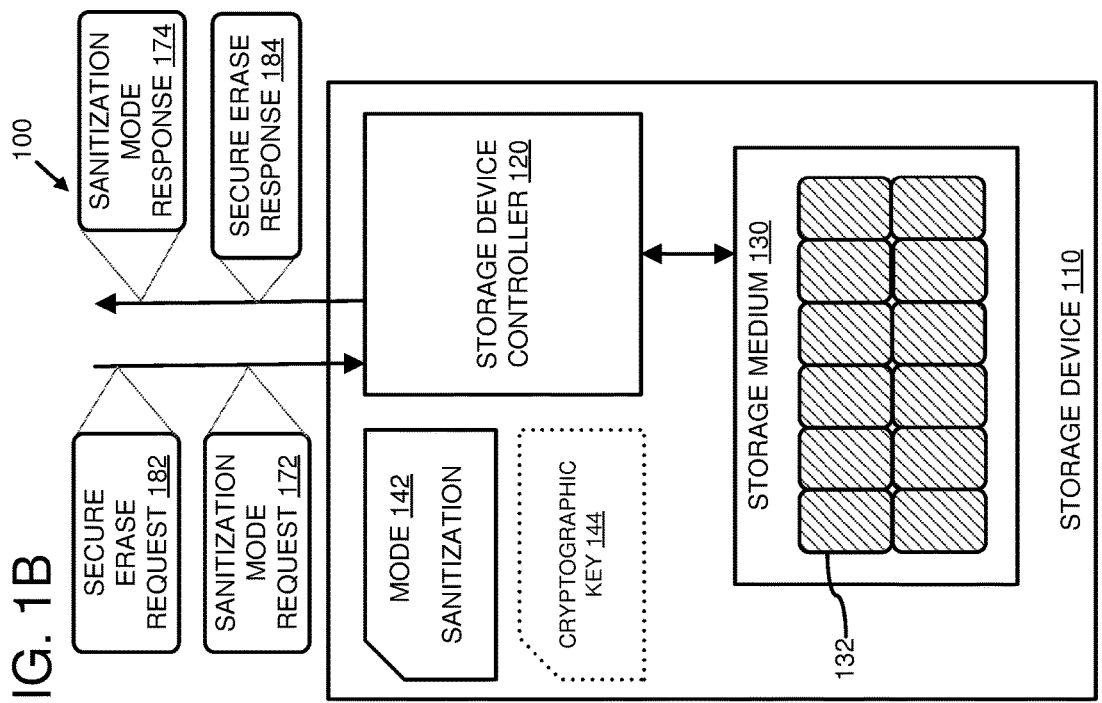
FIGS. 1A-B are system diagrams depicting an example system comprising a storage device configured to support a secure sanitization mode.

In at least some cases, a storage device that supports a cryptographic erase feature (such as a Self-Encrypting Drive) can be sanitized by deleting a cryptographic key used to decrypt the data instead of erasing all of the data stored in the storage device. Doing so, in at least some cases, can reduce the amount of time required to sanitize the storage device. However, using such a storage device can increase a risk of data loss. Since at least some such storage devices do not restrict access to the cryptographic erase feature, there is a risk that a malicious user (or a malfunctioning program) could render data stored on such storage devices unrecoverable by deleting the key used to decrypt the data.

At least some of the embodiments of the technologies described herein solve these problems by enabling storage devices to restrict access to a cryptographic erase operation. For example, a storage device can be configured to support an operational mode in which requests to cryptographically erase the storage device are rejected. The storage device can be configured to support a sanitization mode in which a request to cryptographically erase the storage device will be processed. The storage device can be initialized by default in the operational mode, and access to the sanitization mode can be restricted.

For example, the storage device can support a command to place the storage device in the sanitization mode. The storage device can be configured to reject the command to place the storage device in the sanitization mode unless it is received from a trusted source. Additionally or alternatively, the storage device can be configured to reject the command to place the storage device in the sanitization mode unless the command is received during an initialization of the storage device. In at least some embodiments, the storage device is configured to reject data access requests while it is in the sanitization mode.

In at least one embodiment, a host computer is configured to detect an establishment of a connection to a storage device. The host computer can place the storage device in a sanitization mode and transmit a cryptographic erase command to the storage device as part of an initial setup of the storage device. In a different or further embodiment, a storage device is configured to detect a hardware configuration change in the host computer to which it is connected and to perform a cryptographic erase operation in response to the detection of the change. For example, the storage device can store a record describing hardware components of a host computer to which the storage device is connected. During an initialization of the storage device, the storage device can compare a description of hardware components of a host computer that is initializing the storage device to the record stored in the storage device. If the hardware component descriptions do not match, then the storage device can delete its cryptographic key.

Although the examples described herein refer to storage devices, the technologies described herein can be applied to other types of devices as well. For example, a computing device that is attached to a storage device (such as a host bus array) can be configured to support secure sanitization by using at least some of the techniques described herein to restrict access to a cryptographic erase feature of an attached storage device.

FIG. 1A is system diagram depicting an example system 100 comprising a storage device 110 configured to support a secure sanitization mode. The storage device 110 comprises a storage device controller 120 and a storage medium 130. The storage medium 130 comprises multiple storage locations (e.g., 132) capable of storing data items, such as data blocks, etc. The number of storage locations depicted is provided for illustration purposes and is not intended to be limiting.

The storage device 110 comprises a mode field 142 that indicates a current mode of the storage device 110. The value of the mode field 142 can comprise one or more numbers and/or characters. For example, the mode field 142 can be an enumeration field, such as a bitmask. In FIG. 1A, the mode field 142 is depicted as containing a value indicating that the storage device 110 is in an operational mode. In the operational mode, the storage device 110 is able to receive and process data access requests (e.g., 152), but is unable to process secure erase requests (e.g., 162).

The storage device controller 120 can be configured to receive and process the one or more data access requests 152. For example, the storage device controller 120 can process data access requests using one or more modules of a firmware (not shown) to read and/or write data to/from the storage locations in the storage medium 130.

The storage device 110 comprises a cryptographic key 144. The storage device controller 120 can process the one or more data access requests using the cryptographic key 144. For example, the one or more data access requests 152 can comprise a data write request that includes data to be written to the storage medium 130. The storage device controller 120 can be configured to use the cryptographic key 144 to encrypt the data included in the data write request, and to store the encrypted data in one or more of the storage locations in the storage medium 130. In another example, the one or more data access requests 152 can comprise a request to read data from the storage medium 130. The storage device controller 120 can be configured to determine that the requested data is stored in an encrypted form in the storage medium 130, retrieve the encrypted data from the storage medium 130, decrypt the encrypted data using the cryptographic key 144, and transmit the decrypted data as part of one or more data access responses 154.

In at least one embodiment, the storage device controller 120 is configured to encrypt all data written to the storage medium 130 using the cryptographic key 144 when the mode field 142 indicates that the storage device 110 is in the operational mode. In a different or further embodiment, the storage device controller 120 can be configured to generate the cryptographic key 144 and to store the cryptographic key 144 in a location that is only accessible by the storage device controller 120 (such as a storage location in the storage medium 130, or a different storage medium in the storage device 110, which cannot be accessed by a data access request).

The storage device controller 120 can be configured to receive a secure erase request 162. The storage device controller 120 can be configured to reject the secure erase request 162 when the mode field 142 indicates that the storage device 110 is in the operational mode. The storage device controller can inspect a value of mode field 142, determine that the value indicates that the storage device is in the operational mode, and transmit an erase rejection 164 instead of performing an erase operation. The erase rejection 164 can comprise an error code and/or error message. Additionally or alternatively, the erase rejection 164 can comprise a message indicating that the secure erase request 162 is not supported by the current mode of the storage device.

Figure 1B:
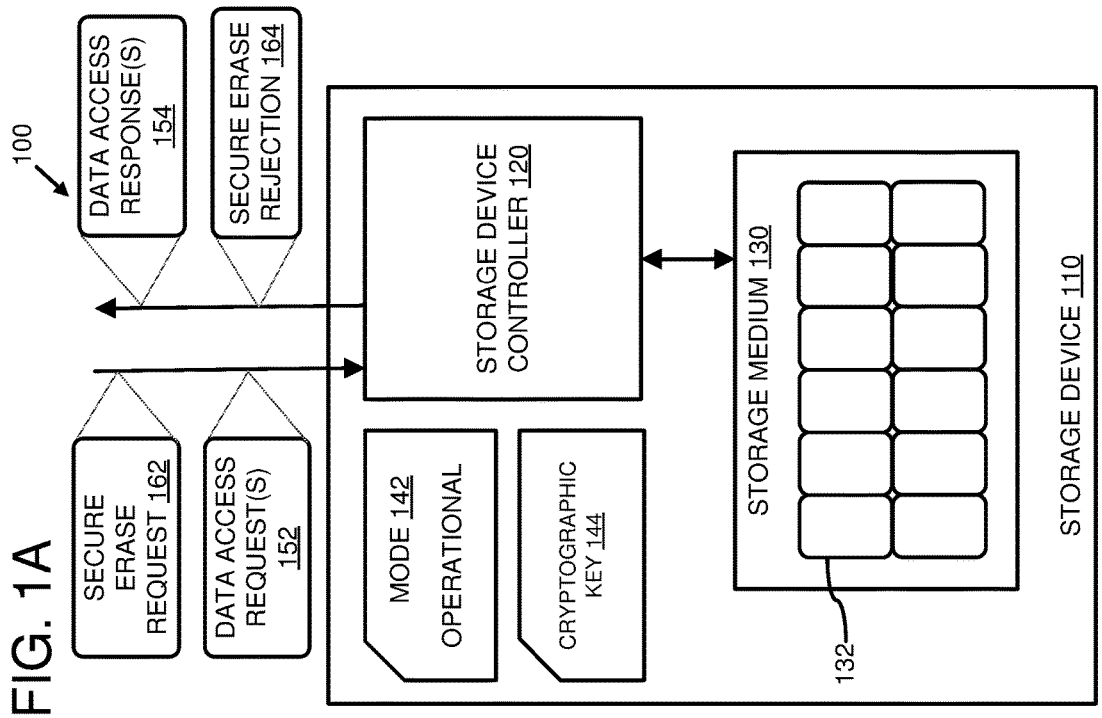

FIG. 1B is a system diagram depicting the example system 100, wherein the storage device 110 is placed in the sanitization mode. In the sanitization mode, the storage device controller 120 can process secure erase requests (e.g., 182). In at least one embodiment, the storage device 110 is configured to reject data access requests when the storage device 110 is in the sanitization mode.

The storage device controller 120 can be configured to receive a request 172 to place the storage device 110 in the sanitization mode. Placing the storage device 110 in the sanitization mode can comprise changing the value of the mode field 142 to indicate that the storage device is in the sanitization mode. The storage device controller 110 can be configured to check the value of the mode field 142 when a secure erase request is received. If the value of the mode field 142 indicates that the storage device 110 is in the sanitization mode, the storage device controller 120 can process the secure erase request. Processing the secure erase request can comprise deleting the cryptographic key 144, thereby rendering data stored in the storage medium 130 that was encrypted using the cryptographic key 144 unrecoverable.

In the example system 100 depicted in FIG. 1B, the storage device controller 120 can be configured to receive a sanitization mode request 172. The storage device controller 120 can be configured to determine that the sanitization mode request 172 is received from a requester that is authorized to place the storage device in the sanitization mode. Determining that the sanitization mode request 172 is received from an authorized requester can comprise determining that the sanitization mode request 172 is received from a trusted source (such as a boot firmware of a host computing device that is connected to the storage device 110 and configured to initialize the storage device). Additionally or alternatively, determining that the sanitization mode request 172 is received from an authorized requester can comprise determining that the sanitization mode request 172 is received during an initialization process (such as a boot process) of the storage device 110.

If the sanitization mode request 172 is received from an authorized requester, the storage device controller 120 can place the storage device 110 in the sanitization mode. In at least one embodiment, placing the storage device 110 in the sanitization mode comprises changing a value of the mode field 142 to a value that indicates that the storage device 110 is in the sanitization mode. For example, in FIG. 1B, the mode field 142 indicates that the storage device 110 is in the sanitization mode. The storage device controller 120 can be configured to transmit a sanitization mode response 174, indicating that the storage device 110 has successfully been placed in the sanitization mode.

The storage device controller 120 can be configured to receive a secure erase request 182 and to inspect the value of the mode field 142 to determine whether the storage device 110 is in the sanitization mode. Upon a determination that the storage device 110 is in the sanitization mode, the storage device controller 120 can perform an erase operation to render data stored in the storage locations (e.g., 132) of the storage medium 130 inaccessible. Performing the erase operation can comprise deleting the cryptographic key 144. Without access to the cryptographic key 144, the storage device controller 120 can no longer decrypt data stored in the storage medium 130 that was encrypted using the cryptographic key 144. For example, in FIG. 1B the cryptographic key 144 is depicted as having been deleted by the storage device controller 120 and data stored in the storage locations (e.g., 132) of the storage medium 130 are depicted as being unrecoverable. Upon completion of the erase operation, the storage device controller 120 can transmit a secure erase response 184 indicating that the secure erase request has been processed.

In at least one embodiment, the storage device controller 120 can be configured to reject requests, other than a secure erase request (e.g., 182), when the storage device 110 is in the sanitization mode. In at least one such embodiment, the storage device controller 120 can be configured to reject requests received after the processing of the secure erase request 182 until the storage device 110 is rebooted. Additionally or alternatively, during an initialization process of the storage device 110, the storage device controller 120 can be configured to detect that the storage device is in the sanitization mode, to place the storage device 110 in the operational mode, and to generate a new cryptographic key. In such an embodiment, subsequent requests to stored data in the storage medium 130 can be processed, at least in part, by encrypting the data using the new cryptographic key and storing the encrypted data in one or more of the storage locations (e.g. 132) of the storage medium 130.

In at least some embodiments, the storage device 110 can comprise a firmware (not shown) that can contain one or more command modules that can be used by the storage device controller 120 to process data access requests (e.g., 152) and secure erase requests (e.g., 162 and 182). In such an embodiment, the mode field 142 and/or cryptographic key 144 can be stored as part of the firmware. Additionally or alternatively, the mode field 142 and/or the cryptographic key 144 can be stored in one or more of the storage locations of the storage medium 130 that can only be accessed by the storage device controller 120. In a different or further embodiment, separate command modules of the firmware can be used when the storage device is in the operational mode and when the storage device is in the sanitization mode.

In any of the examples described herein, a storage device can be a device capable of storing data in one or more physical storage media. For example, the storage device can be a magnetic storage device, such as a hard disk drive, that is capable of storing data in one or more magnetic recording formats. Other examples of storage devices include flash storage devices (such as NAND-type flash devices and NOR-type flash devices), and random access data storage devices (such as DRAM devices). Further examples of storage devices include non-volatile dual in-line memory modules (NVDIMMs). Particular examples include solid-state drives (SSDs).

In some embodiments, the storage device comprises multiple disparate storage media. For example, the storage device can be a hard disk drive that comprises one or more magnetic disks and an internal memory. In another example, the storage device comprises solid state storage and magnetic storage. In another example the storage device comprises multiple magnetic disks organized as a Redundant Array of Independent Disks (RAID). Other combinations of disparate storage media are also possible.

In any of the examples described herein, a storage device controller can comprise one or more hardware components of a storage device. The storage device controller can comprise a firmware stored in a read-only memory (ROM) of the storage device, a storage medium of the storage device, or some combination thereof. Additionally or alternatively, the storage device controller can be implemented at an intermediate layer between an application and the storage device. Such an intermediate layer controller can comprise software (such as a driver) and one or more processors, a host bus adapter controller, a system-on-chip (SoC), a field-programmable gate array (FPGA), and/or an application-specific integrated circuit (ASIC).

In some embodiments, the storage device controller can be part of an application. In such an embodiment, the application may use the storage device controller to access a storage device directly, without using an intermediate layer, such as a driver.

The storage device controller can be located on a computer containing the storage device, or on a separate computer that is connected to the storage device via a communications channel, such as a computer network.

In any of the examples described herein, a data block (or block of data) can be a sequence of data units, such as bytes, bits, etc., that has a fixed size (sometimes referred to as a "block size"). In a storage device that supports data blocks, data is read from and/or written to the storage device one block at a time. A data block can have a physical address that identifies a position where it is stored in the storage device and a logical address, such as a logical block address (LBA), which is used by external components to identify and access the data block. By using logical addresses, the physical storage locations of data blocks in the storage device can change without having to notify or update any external components.

In any of the examples described herein, a host computer can be a server or other computing device that comprises a processor and is connected to a storage device. In at least some embodiments, the connection between the host computer and the storage device can be a physical connection (such as a physical cable connection, a connection between the storage device and a hardware bus of the host computer, etc.). Additionally or alternatively, the connection between the storage device and the host computer can be a logical connection (such as a network connection). The host computer is connected to the storage device and configured to transmit commands, such as data access commands (i.e., commands to perform data read and write operations), sanitization mode commands, initialization commands, cryptographic erase commands, or the like, to the storage device. The host computer can be configured to receive command responses from the storage device. The connection can be a direct connection, such as a cable or bus connection, an indirect connection, such as a connection over a network, or some combination thereof. In scenarios where the host computer is connected to more than one storage device, the various connections can be of the same type or different types.

In some embodiments, the host computer can comprise a storage device controller connected to multiple storage devices. In at least some embodiments, the host computer can be a computing device configured to provide a unified access point for multiple connected storage devices, such as a host bus adapter, a JBOD ("just a bunch of drives/disks") device, a RAID array controller, etc.

Figure 2:
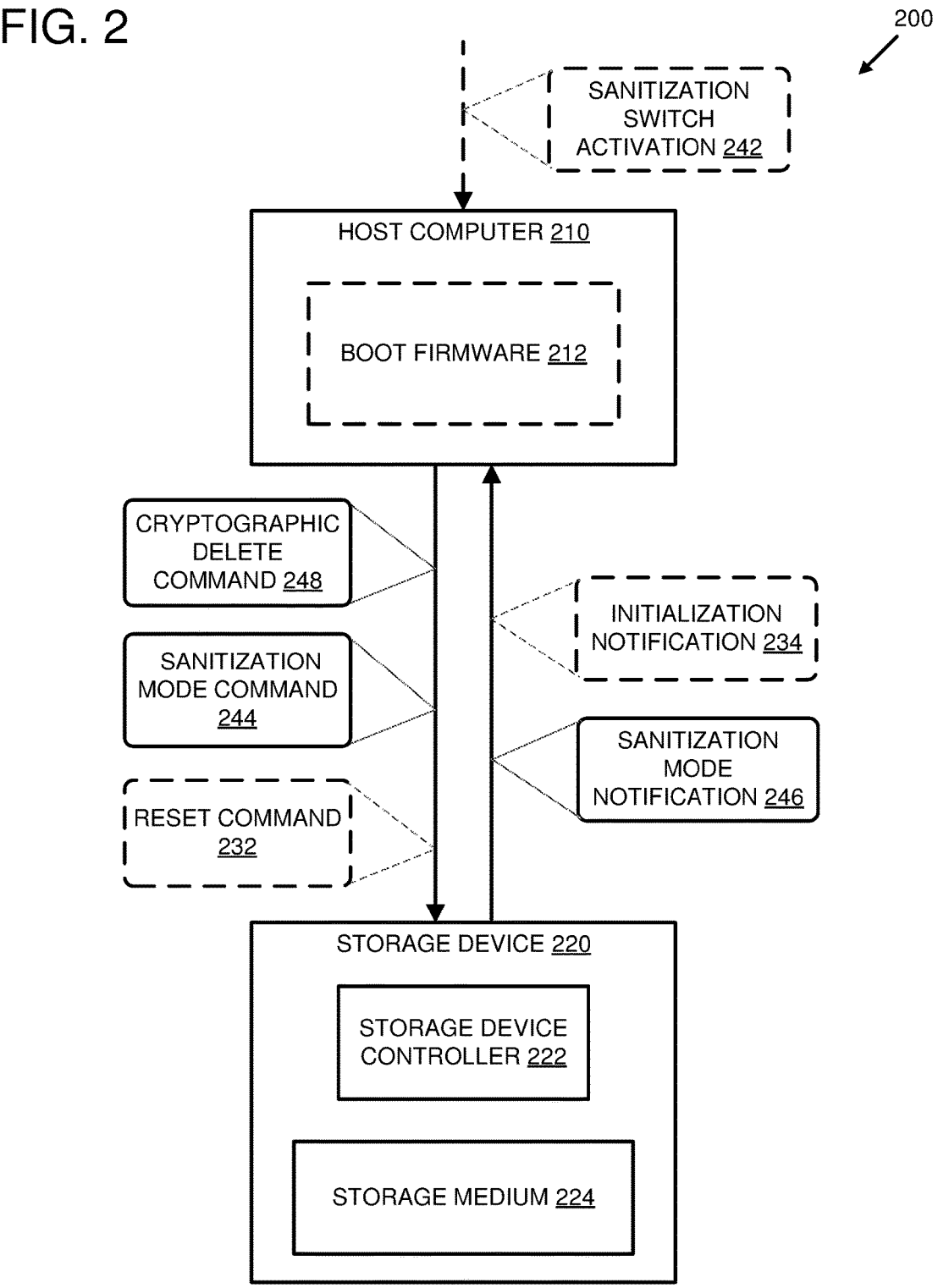
FIG. 2 is a system diagram depicting a host computer configured to place a storage device in a secure sanitization mode.

FIG. 2 is a system diagram depicting an example system 200 comprising a host computer 210 connected to a storage device 220, wherein the host computer 210 is configured to place a storage device 220 in a secure sanitization mode.

The host computer 210 is configured to transmit data (not shown) to the storage device 220 to be stored in the storage medium 224 and to transmit requests (not shown) to the storage device 220 to retrieve the data stored in the storage medium 224. The storage device 220 comprises a storage device controller 222 configured to store the data received from the host computer 210 in the storage medium 224, wherein storing the data comprises encrypting the data using a cryptographic key. The storage device controller 222 can be configured to retrieve the data from the storage medium 224, wherein retrieving the data comprises decrypting the data using the cryptographic key and to transmit the decrypted data to the host computer 210. The storage device controller 222 can be configured to place the storage device 220 in an operational mode, wherein commands to delete the cryptographic key are rejected.

The host computer 210 is configured to transmit a command 244 to the storage device 220 to place the storage device 220 in a secure sanitization mode. The storage device controller 222 is configured to receive the command 244 from the host computer 210 to place the storage device controller in the secure sanitization mode, wherein commands to delete the cryptographic key are accepted by the storage device controller 222.

Optionally, the host computer 210 can comprise a boot firmware 212 configured to initialize the storage device 220. The boot firmware 212 can comprise a boot operating system (such as BIOS, etc.) configured to initialize the host computer 210 and the storage device 220. In at least one embodiment, the boot firmware 212 can be part of a boot chip. The boot firmware 212 can be configured to transmit the command 244 to the storage device controller 220.

The storage device controller 222 is configured to determine whether the command to place the storage device in the sanitization mode is authorized. In an embodiment where the host computer 210 comprises the boot firmware 212, the storage device controller 222 can be configured to determine that the command 244 to enter the sanitization mode is received from the boot firmware 212 of the host computer 210. Optionally, the boot firmware 212 can be configured to transmit a reset command 232 to the storage device 220. The storage device controller 222 can be configured to receive the reset command 232, and to enter an initialization mode. In such an embodiment, determining that the command 244 to enter the sanitization mode is authorized can comprise determining that the storage device 220 is in the initialization mode when the command 244 is received. In at least some embodiments, the reset command 232 can comprise a soft-reset command, such as a command to re-initialize the storage device 220 without terminating a power supply to the storage device 220. In a different or further embodiment, the reset command 232 can be a hard-reset command, such as a command to cycle a power supply (i.e., terminate the power supply and then reestablish the power supply) to the storage device 220 and to initialize the storage device once the power supply is reestablished.

In at least one embodiment, the storage device controller 222 can transmit an initialization notification 234 to the host computer 210, indicating that the storage device 220 has entered the initialization mode. In such an embodiment, the boot firmware 212 can be configured to receive the initialization notification 234 and to transmit the command 244 to enter the sanitization mode responsive to receipt of the initialization notification 234.

If the storage device controller determines that the command 244 is authorized, the storage device controller 222 can place the storage device 220 in the secure sanitization mode. Placing the storage device 220 in the secure sanitization mode can comprise setting a device mode field of the storage device 220 to a value indicating that the storage device is in the secure sanitization mode. Such a device mode field can be stored in the storage medium 130 or another storage medium of the storage device 220. Additionally or alternatively, placing the storage device 220 in the sanitization mode can comprise loading one or more storage device firmware modules that comprise instructions for processing cryptographic delete commands. Optionally, the storage device controller 222 can transmit a response message (not shown) to the host computer 210, indicating that the storage device 220 has been placed in the secure sanitization mode.

The host computer 210 is configured to transmit a cryptographic delete command 248 to the storage device controller 222 to delete the cryptographic key used to encrypt data stored in the storage medium 224. While the storage device 220 is in the secure sanitization mode, the storage device controller 222 can be configured to receive and process the command 248 to delete the cryptographic key. Deleting the cryptographic key can prevent the storage device controller 222 from subsequently retrieving the encrypted data stored on the storage medium 224.

Optionally, the host computer 210 can detect an activation 242 of a physical switch connected to the host computer 210 and transmit the command 244 to enter the sanitization mode responsive to the detection of the activation 242 of the physical switch. For example, the host computer 210 can comprise a switch (such as a button, etc.) that, when activated, causes a signal to be transmitted that can be detected by the host computer 210. In an embodiment where the host computer 210 comprises the boot firmware 212, the boot firmware can be configured to detect the activation 242 of the physical switch during a boot operation of the host computer 210, and to transmit the commands 244 and 248 to the storage device 220 to place the storage device 220 in the secure sanitization mode and to delete the cryptographic key responsive to the detection of the activation 242 of the switch.

In a different or further embodiment, the physical switch can comprise two jumper pins that, when connected by a jumper, create an electronic circuit that causes the signal to be transmitted that can be detected by a component of the host computer 210 (such as the boot firmware 212).

Figure 3:
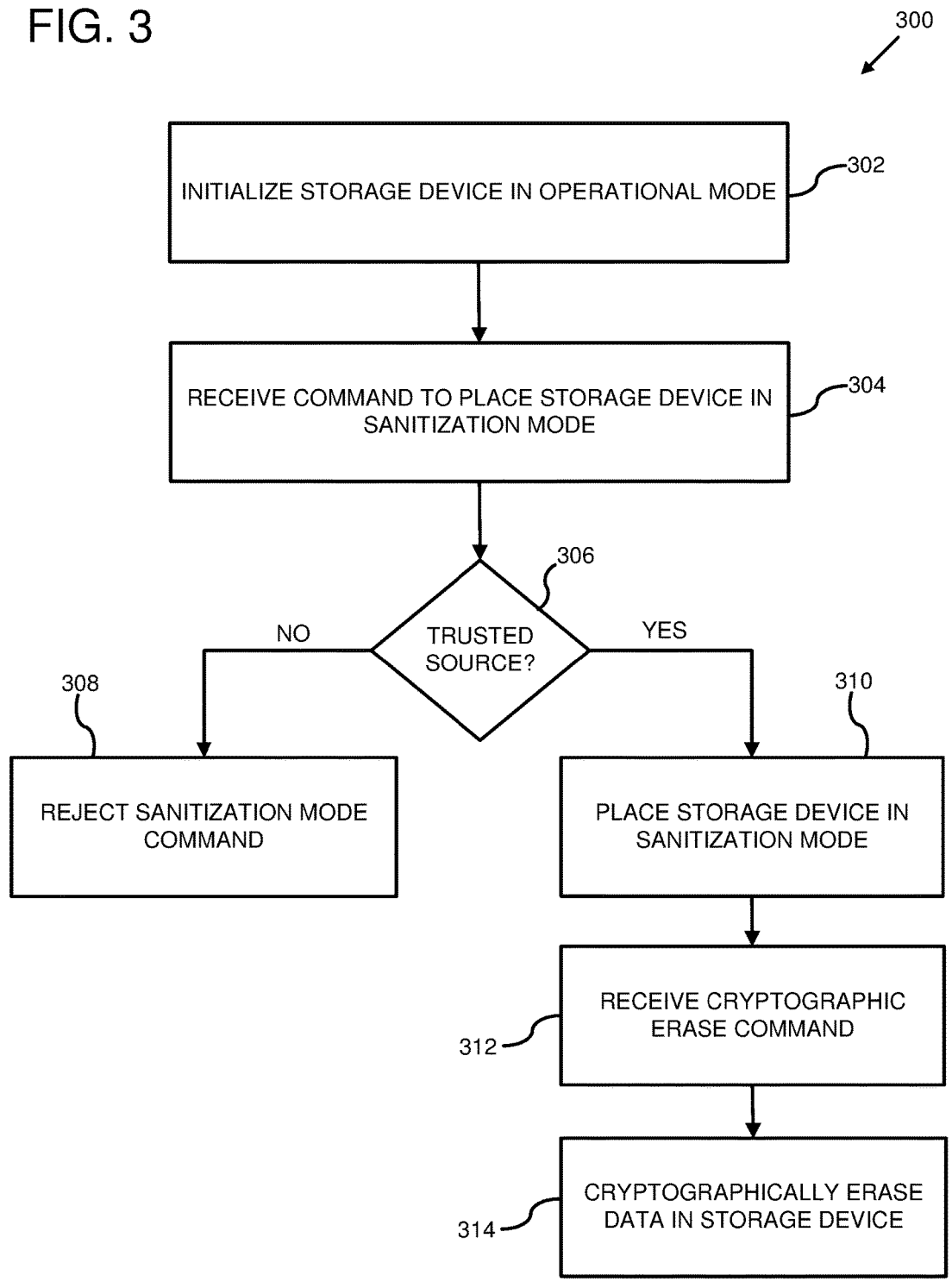
FIG. 3 is a flowchart of an example method for placing a storage device in a sanitization mode and processing commands to cryptographically erase data stored in the storage device.

FIG. 3 is a flowchart of an example method 300 for placing a storage device in a sanitization mode and processing commands to cryptographically erase data stored in the storage device. Any of the example systems described herein can be used to perform the example method 300.

At 302, a storage device is initialized in an operational mode. In the operational mode, the storage device can receive data manipulation commands, such as data write and read commands. The storage device can process received data write commands by encrypting the received data using a cryptographic key stored in the storage device, and writing the encrypted data to a storage medium of the storage device. The storage device can process received data read commands by retrieving the encrypted data from the storage medium, decrypting the encrypted data, and transmitting the decrypted data to the transmitter of the data read requests. In the operational mode, the storage device rejects commands to cryptographically erase data stored in the storage device.

At 304, a command is received at the storage device to place the storage device in a sanitization mode. In the sanitization mode, the storage device can accept and process received cryptographic erase commands.

At 306, the storage device determines whether the command to place the storage device in the sanitization mode is received from a trusted source. In at least some embodiments, determining that the command is received from a trusted source comprises determining that the command is received from an authenticated host computer. For example, an authenticated host computer can be in possession of a secret key that is shared with the storage device, and is used by the host computer to encrypt secure commands transmitted to the storage device (such as commands to reboot the storage device and/or commands to put the storage device in the sanitization mode). The storage device can be configured to authenticate commands received by the storage device using the shared secret key.

In at least one embodiment, the storage device can be configured to receive a command to place the storage device in the sanitization mode only at a boot time of the storage device. In a configuration where the authenticated host is physically connected to the storage device, the authenticated host can ensure that it is the first computing device to issue a command to place the storage device in the sanitization mode when it is booted. In at least some scenarios, such a configuration can prevent malicious users from transmitting commands to the storage device to perform a cryptographic erase command.

In at least one embodiment, the ability to issue a command to place a storage device in the sanitization mode is restricted to one or more authenticated agent processes running on a host computer connected to the storage device. In such an embodiment, attempts to issue a command to place a storage device in the sanitization mode that are made by other processes will be rejected. In a different or further embodiment, the ability to place the storage device in the sanitization mode is restricted to a boot firmware of a host computer connected to the storage device.

In at least one embodiment, an operating system (or other process) of the host computer can be configured to receive a request to cryptographically erase data stored on a connected storage device. The host computer operating system can determine whether the request is received from a trusted source (such as by verifying that an authenticated user identity associated with the request is authorized to perform the requested operation, by verifying an authentication key provided with the request, etc.). If the host computer operating system determines that the request is from a trusted source, the host computer can issue a command to the storage device to place the storage device in the sanitization mode. In at least one such embodiment, the host computer operating system configures a boot firmware of the host computer to issue the sanitization mode command to the storage device during a boot process of the host computer and then reboots the host computer. When the host computer reboots, the boot firmware can issue the command to the storage device to enter the sanitization mode.

If it is determined that the sanitization mode command is not from a trusted source, then at 308 the sanitization mode command is rejected. Rejecting the command can comprise returning an error message, such as an error code. Additionally or alternatively, rejecting the command can comprise returning a message indicating that the storage device does not support the sanitization mode.

If it is determined that the sanitization mode command is from a trusted source, then at 310 the storage device is placed in the sanitization mode. Placing the storage device in the sanitization mode can comprise changing a value of an internal mode indicator of the storage device that indicates that the storage device is in the operational mode to a value that indicates that the storage device is in the sanitization mode. In at least some embodiments, the internal mode indicator can be stored in a firmware of the storage device. The storage device can refer to the internal mode indicator before processing a cryptographic erase command that is received. If the internal mode indicator indicates that the storage device is in the operational mode, the storage device can reject any received cryptographic erase command. Optionally, in the sanitization mode the storage device can be restricted to only processing a cryptographic erase command.

At 312, a cryptographic erase command is received while the storage device is in the sanitization mode. The storage device can be configured to determine that it is in the sanitization mode. For example, the storage device can inspect the internal mode value of the storage device. Additionally or alternatively, the storage device can be configured to use one or more firmware modules to process received commands in the sanitization mode that are different from one or more firmware modules that are used to process commands while the storage device is not in the sanitization mode.

At 314, the storage device processes the cryptographic erase command by cryptographically erasing data stored in the storage device. The data can be cryptographically erased by deleting the cryptographic key used by the storage device to decrypt the data stored in the storage device. In at least one embodiment, the storage device is configured to store all data in an encrypted format using an encryption/decryption key that is stored in the storage device and is not accessible outside of the storage device. In such an embodiment, deleting the encryption/decryption key can make the data stored in the storage device unreadable.

In at least some embodiments, the storage device rejects commands received subsequent to the processing of the cryptographic erase command while the storage device remains in the sanitization mode. The storage device can be configured to receive a command to take the storage device out of the sanitization mode. In at least one such embodiment, the storage device can be taken out of the sanitization mode by restarting the storage device. For example, the storage device can be configured to boot into the operational mode by default after the storage device is restarted.

Figure 4:
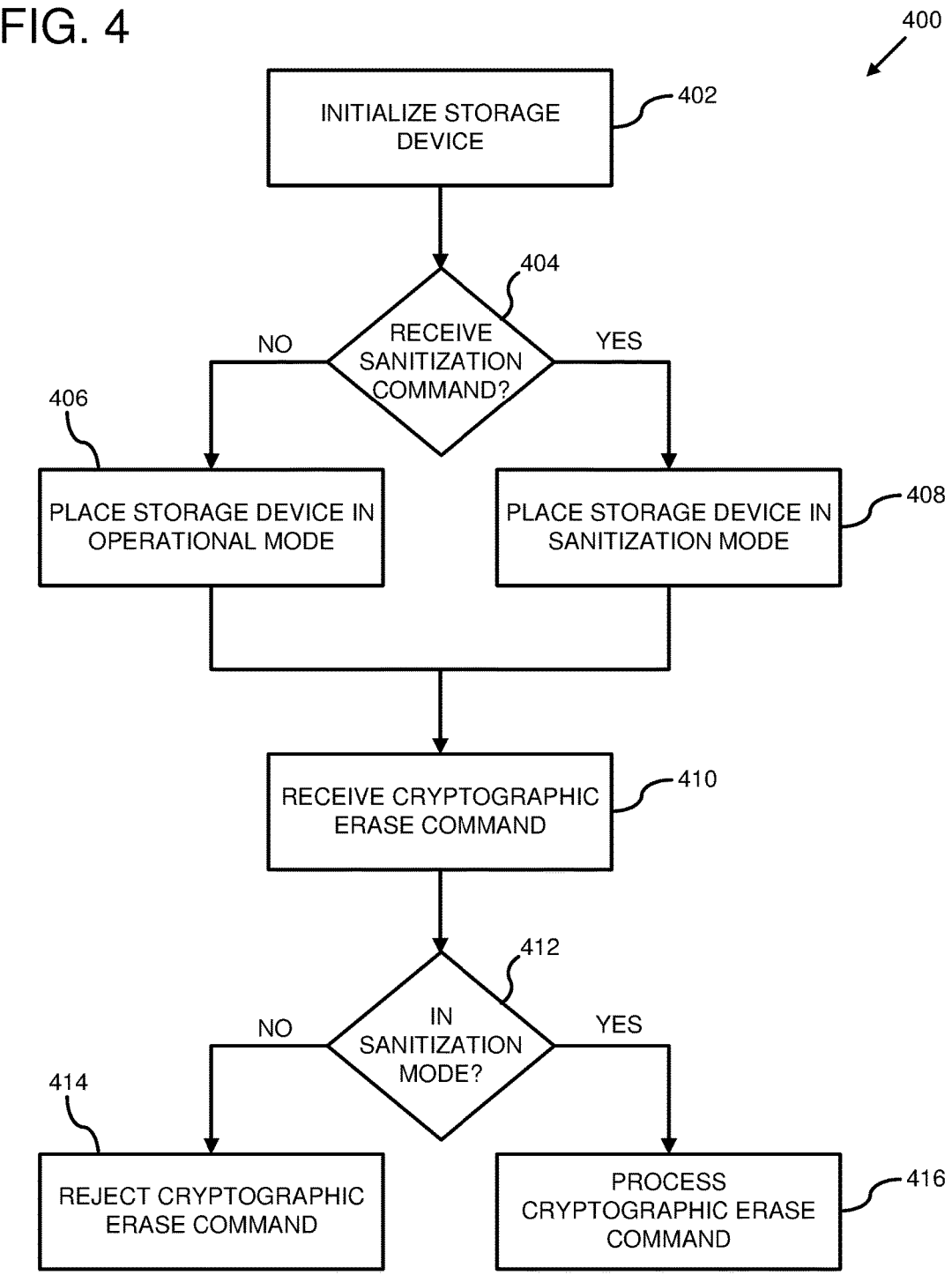
FIG. 4 is flowchart of an example method for initializing a storage device in either an operational mode or a sanitization mode.

FIG. 4 is flowchart of an example method 400 for initializing a storage device in an operational mode or a sanitization mode. Any of the example systems described herein can be used to perform the example method 400.

At 402, a storage device is initialized. The storage device can be initialized by providing a power supply to the storage device and transmitting a command to a controller of the storage device to initiate a boot process of the storage device. The controller can comprise one or more hardware components of the host computing device and/or one or more software components of the host computing device. In at least some embodiments, the command to initiate the boot process can be transmitted to the storage device by a host computing device connected to the storage device.

At 404, it is determined whether a sanitization command is received during the initialization of the storage device. The sanitization command can comprise a request to initialize the storage device in a sanitization mode. In at least some embodiments, the sanitization command is transmitted to the storage device by a boot firmware of a host computing device connected to the storage device.

If the sanitization command is received during the initialization of the storage device, then at 408 the storage device is placed in a sanitization mode. If the sanitization command is not received, then the storage device is placed in an operational mode. Placing the storage device in the sanitization mode can comprise setting a device mode field to a value associated with the sanitization mode. Placing the storage device in the operational mode can comprise setting the device mode field to a value associated with the operational mode. The device mode field can be stored in a location accessible to the controller. In at least one embodiment, the controller can be configured to receive the sanitization command during the execution of the boot process of the storage device and to store a value for the device mode field in a storage location of the storage device that is only accessible by the controller. In a different or further embodiment, different firmware modules can be loaded into the controller of the storage device depending the mode of the storage device.

At 410 a cryptographic erase command is received at the storage device. The storage device can be configured to encrypt data stored on one or more storage media of the storage device using a cryptographic key, and to decrypt the encrypted data using the cryptographic key. The cryptographic erase command can be processed by the storage device by erasing the cryptographic key, thereby preventing decryption of the encrypted data stored on the one or more storage media of the storage device.

At 412, it is determined whether the storage device is in the sanitization mode. The determination can comprise retrieving a value of the device mode field and determining whether the device mode field value is a value associated with the sanitization mode or a value associated with the operational mode. In an alternative embodiment, when the storage device is in the operational mode, a first firmware module can be loaded and used to process received commands; and, when the storage device is in the sanitization mode, a second firmware module can be loaded and used to process received commands. In such an embodiment, determining whether the storage device is in the sanitization mode can be implicit in the choice of firmware module(s) that is/are loaded and used to receive the cryptographic erase command.

If the storage device is not in the sanitization mode, then at 414 the cryptographic erase command is rejected. Rejecting the cryptographic erase command can comprise transmitting an error message in response to the cryptographic erase command. Additionally or alternatively, the storage device can transmit a response message indicating that the cryptographic erase command is not supported by the storage device in its current mode.

If the storage device is in the cryptographic erase mode, then at 416 the cryptographic erase command is processed. Processing the cryptographic erase command can comprise deleting the cryptographic key used to encrypt the data stored on the storage device. In at least one embodiment, processing the cryptographic erase command can comprise generating a new cryptographic key and replacing the deleted cryptographic key with the new cryptographic key.

Figure 5:
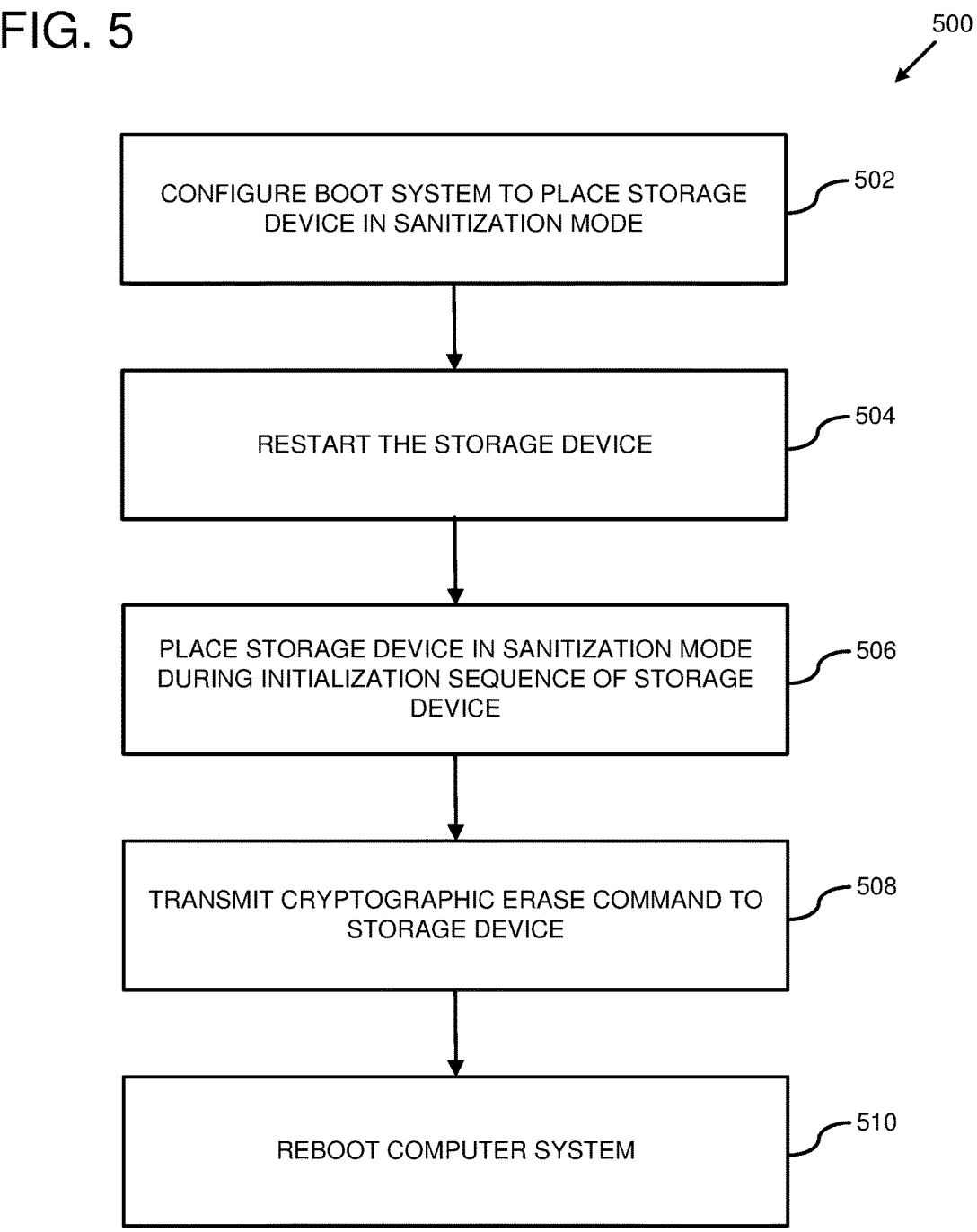
FIG. 5 is a flowchart of an example method for performing a cryptographic erase command in a secure sanitization mode.

FIG. 5 is a flowchart of an example method 500 for performing a cryptographic erase command in a secure sanitization mode. The example method 500 can be performed using any of the example systems described herein.

At 502, a boot system of a host computer is configured to place a storage device connected to the host computer in a sanitization mode. The boot system can comprise a boot firmware (such as a BIOS, etc.) that is configured to initialize the host computer. In at least one embodiment, the boot system comprises a boot chip (such as an ASIC, SoC, etc.) connected to a motherboard of the host computer. The configuration of the boot system can comprise setting a flag value in a storage location that is read by the boot system during an initialization of the host computer. In at least one embodiment, the flag value can be set by a physical switch connected to the host computer. For example, activation of the physical switch can complete a circuit that, when supplied with power, causes a signal to be transmitted to the boot system, wherein the signal indicates that the boot system should place the storage device in a sanitization mode.

In a different or further embodiment, the flag can be set by an operating system of the host computer. In such an embodiment, the operating system of the host computer can be configured to set the flag value in response to the receipt of a request to reboot the storage device in the sanitization mode. The operating system can be configured to reject such a command unless it is receive from an authenticated user (such as a System Administrator or the like).

At 504, the storage device is restarted by the boot system of the host computer. The boot system can be configured to place the storage device in the sanitization mode by restarting the storage device and then placing the storage device in the sanitization mode during an initialization sequence of the storage device. In at least one embodiment, the boot system is configured to reboot the host computer and to initialize the storage device as part of a boot sequence of the host computer. In a particular embodiment, configuring the boot system at 502 to place the storage device in the sanitization mode automatically causes the restarting of the storage device at 504 to occur. Alternatively, the restarting of the storage device at 504 can occur independently of the configuring of the boot system at 502.

At 506, the storage device is placed in the sanitization mode during an initialization sequence of the storage device. Placing the storage device in the sanitization mode can comprise transmitting a sanitization mode command from the boot system to the storage device. For example, the boot system can receive a message from the storage device, indicating that an initialization sequence of the storage device has begun. The boot system can determine whether it is configured to place the storage device in the sanitization mode (such as by inspecting a flag value, detecting a sanitization mode signal, etc.). If the boot system is configured to place the storage device in the sanitization mode, the storage device can transmit the sanitization mode command to the storage device.

The storage device can be configured to receive the command to place the storage device in the sanitization mode and to determine whether the command is authorized. Determining whether the command to enter the sanitization mode is authorized can comprise determining whether the command is received during the storage device initialization sequence. For example, the storage device can be configured to enter the sanitization mode only during the initialization sequence of the storage device. Additionally or alternatively, the storage device can be configured to accept the sanitization mode command only if it is received from the boot system of the host computer that is initializing the storage device.

Placing the storage device in the sanitization mode can comprise setting a device mode field in the storage device that is inspected by a firmware of the storage device to determine whether a cryptographic erase command should be processed. Additionally or alternatively, the storage device can be configured to load a firmware (or firmware module(s)) in response to the receipt of the sanitization mode command that is different from a firmware (or firmware module(s)) that would be loaded by default. Such a separate firmware (or firmware module(s)) can comprise instructions that can be executed to process a cryptographic erase command, whereas such instructions can be omitted from the firmware (or firmware module(s)) that would be loaded by default.

In at least some embodiments, the storage device rejects commands to place the storage device in the sanitization mode while the storage device is running in an operational mode. In such embodiments, a reset command can be transmitted to the storage device to cause the storage device to restart. After the storage device has restarted, but before it has re-entered the operational mode, the command can then transmitted to the storage device to put the storage device in the sanitization mode. For example, the boot system of the host computer can be instructed to update a device mode flag in the firmware of the storage device to indicate that the storage device is in the sanitization mode.

At 508, a cryptographic erase command is transmitted to the storage device by the boot system of the host computer. The boot system can be configured to transmit the cryptographic erase command after detecting that the storage device has entered the sanitization mode. For example, the storage device can transmit a message to the boot system of the host computer, indicating that the sanitization mode command has been processed. Additionally or alternatively, the boot system can be configured to poll the storage device, requesting its current mode, and to detect when the storage device has entered the sanitization mode. After determining that the storage device has entered the sanitization mode, the boot system can transmit the cryptographic erase command to the storage device.

The storage device can be configured to receive the cryptographic erase command and to process the cryptographic erase command if it is in the sanitization mode. Processing the cryptographic erase command can comprise deleting a cryptographic key that is stored in the storage device and used to encrypt and decrypt data stored in the storage device. By deleting the cryptographic key, the data stored in the storage device that was encrypted using the cryptographic key can be rendered inaccessible without deleting the data directly. In at least one embodiment, the storage device transmits a message to the boot system of the host computer, indicating that the cryptographic erase command has been processed.

At 510, the computer system is rebooted. In at least one embodiment, the boot system is configured to monitor the processing of the cryptographic erase command and to initiate the rebooting of the computer system after detecting that the processing of the cryptographic erase command has completed. During a boot process of the boot system, the boot system can be configured to initialize the storage device in an operational mode, wherein the storage device is configured to reject cryptographic erase commands. Additionally or alternatively, the storage device can be configured to initialize in an operational mode, wherein cryptographic erase commands are rejected, when a command is not transmitted to the storage device by the boot system during the boot sequence of the storage device.

Figure 6:
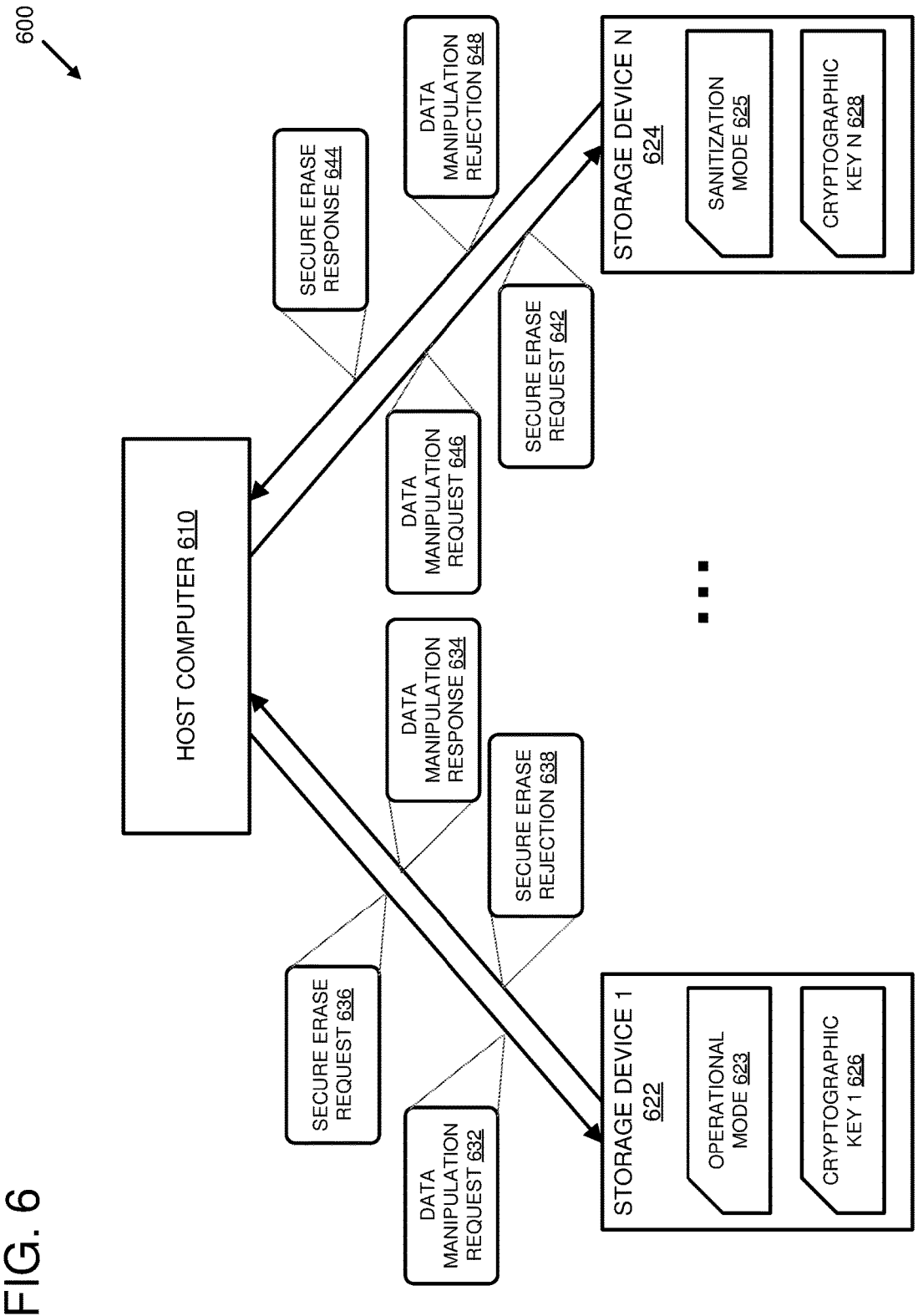
FIG. 6 is a system diagram depicting an example system comprising a host computer connected to multiple storage devices that support a secure sanitization mode.

FIG. 6 is a system diagram depicting an example system 600 comprising a host computer 610 connected to multiple storage devices 622-624 that support a secure sanitization mode. The connections between the host computer 610 and the multiple storage devices 622-624 can comprise physical connections, logical connections, or some combination thereof. In a particular embodiment, the host computer 610 comprises a host bus adapter into which the multiple storage devices 622-624 are mounted.

The host computer 610 can be configured to transmit requests to the multiple storage devices 622-624 and to receive responses from the multiple storage devices 622-624. The requests can comprise data manipulation requests (e.g., 632 and 646) and/or secure erase requests (e.g. 636 and 642). Example data manipulation requests include requests to write data to a storage device and requests to read data from a storage device. A secure erase request can comprise the request to cryptographically erase data stored on the storage device. The multiple storage devices 622-624 can be configured to support different storage device modes in which different types of requests can be processed, and in which other types of requests are rejected.

In FIG. 6, the storage device 622 is in an operational device mode 623. In the operational device mode 623, the storage device 622 is configured to receive the data manipulation request 632 and to process the data manipulation request 632 using the cryptographic key 626. In one example, the data manipulation request 632 comprises a request to write data to the storage device 622. The storage device 622 can process such a request by encrypting the data using the cryptographic key 626 and storing the encrypted data in one or more storage media (not shown) of the storage device 622. In another example, the data manipulation request 632 comprises a request to read data from the storage device 622. The storage device 622 can be configured to process such a request by retrieving encrypted data from one or more storage media of the storage device 622, decrypt in the encrypted data using the cryptographic key 626, and transmitting the decrypt a data in a data manipulation response 634 to the host computer 610.

While in the operational device mode 623, the storage device 622 can be configured to reject secure erase requests. For example, in FIG. 6 the host computer 610 transmits a secure erase request 636 to the storage device 622. The storage device 622 receives the secure erase request 636, determines that the storage device 622 is currently in the operational device mode 623, and transmits a secure erase rejection 638 to the host computer 610 instead of processing the secure erase request 636.

In FIG. 6, the storage device 624 is in a sanitization mode 625. In the sanitization mode, the storage device 624 can be configured to receive and process the secure erase request 642. For example, the storage device 624, upon receipt of the secure erase request 642, can determine that the storage device 624 is in the sanitization mode 625 and can process the secure erase request, at least in part, by deleting the cryptographic key 628. Additionally or alternatively, the storage device 624 can be configured to replace the cryptographic key 628 with a newly generated cryptographic key that can be used to subsequently encrypt data written to the storage device 624 when the storage device 624 is in an operational device mode. The storage device 624 can include one or more storage media storing data encrypted with the cryptographic key 628. By deleting the cryptographic key 628, the encrypted data stored in the one or more storage media of the storage device 624 can be rendered unreadable. The storage device 624 can be configured to transmit a secure erase response 644 to the host computer 610 upon completion of the processing of the secure erase request 642. The secure erase response 644 can indicate that the cryptographic key 628 is been deleted.

While in the sanitization device mode 625, the storage device 624 can be configured to reject data manipulation requests received from the host computer 610. For example, in FIG. 6 the host computer 610 is depicted as transmitting a data manipulation request 646 to the storage device 624. Upon receipt of the data manipulation request 646, the storage device 624 can determine that it is in the sanitization device mode 625, and can transmit a data manipulation rejection 648 to the host computer 610 instead of processing the data manipulation request.

In at least one embodiment, the host computer 610 can be configured to detect an establishment of a connection between the host computer and one of the multiple storage devices 622-624, and to sanitize the connected storage device before using the storage device to process data manipulation requests. For example, the host computer 610 can detect an establishment of an initial connection between the storage device 624 and the host computer 610 (such as by detecting that the storage device 624 has been connected to a communication bus of the host computer 610 for the first time), and can place the storage device 624 in the sanitization mode 625. The host computer 610 can place the storage device 624 in the sanitization mode 625 by transmitting a sanitization mode command (not shown) to the storage device 624 during an initialization of the storage device 624. After the storage device 624 has entered the sanitization mode 625, the host computer can transmit the secure erase request 642 to the storage device 624 to cryptographically erase any data that previously might have been stored on the storage device 624. The storage device 624 can be configured to reject any data manipulation requests transmitted by the host computer 610 (or another entity) until the storage device 624 has been restarted and placed in an operational device mode.

Figure 7:
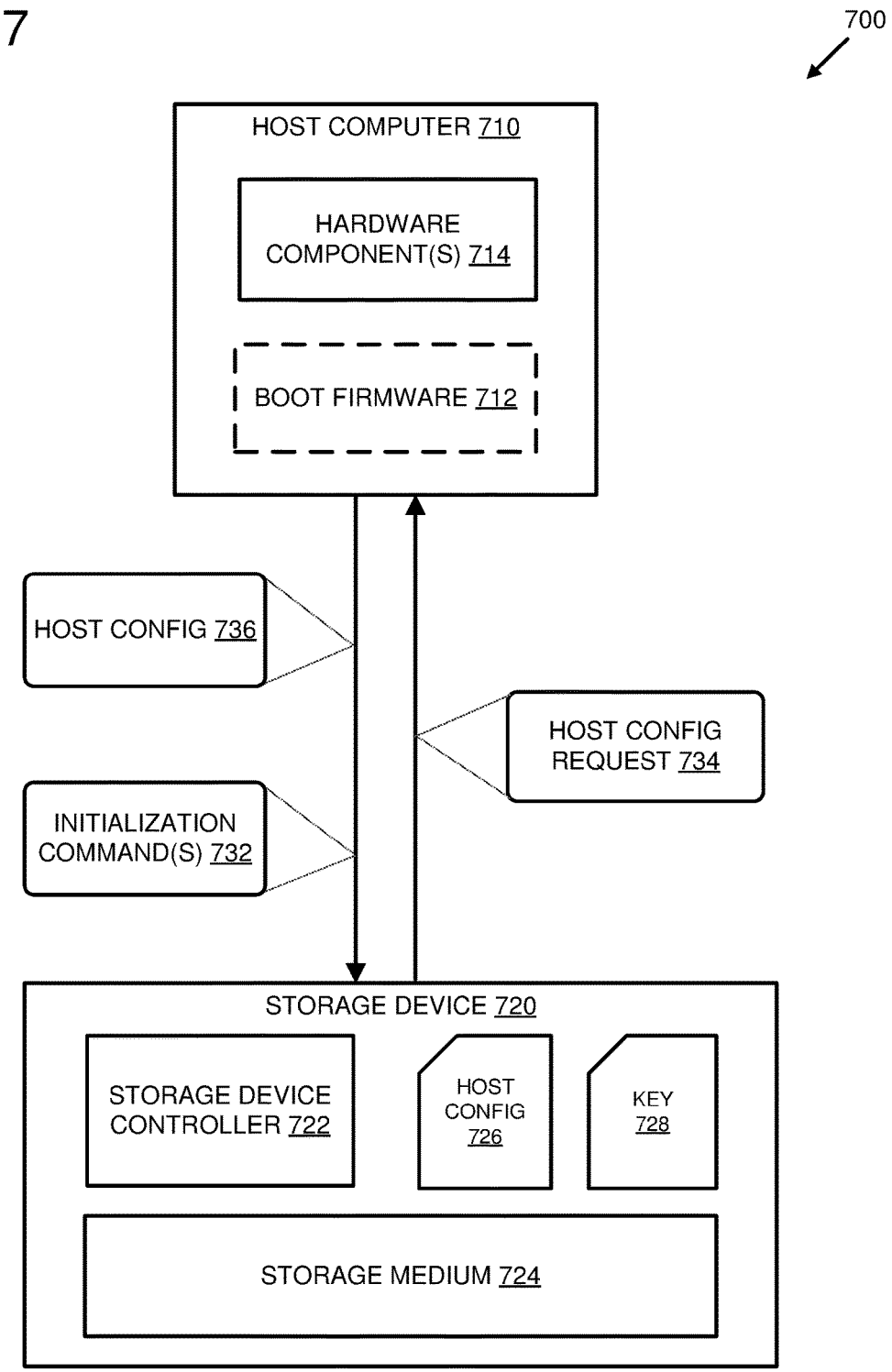
FIG. 7 is a system diagram depicting an example system comprising a storage device configured to perform a secure erase upon detection of a host configuration change.

FIG. 7 is a system diagram depicting an example system 700 comprising a storage device 720 configured to perform a secure erase operation upon detection of a host configuration change. The example system 700 further comprises a host computer 710. The host computer 710 comprises one or more hardware components 714. Example hardware components include processors, memories, a motherboard, PCI cards, etc. In at least some embodiments, the hardware components 714 can comprise devices connected to the host computer 710 (such as storage devices, human interface devices, display devices, etc.).

The host computer 710 is configured to transmit one or more initialization commands 732 to the storage device 720. Optionally, the host computer 710 comprises a boot firmware 712 that is configured to transmit the initialization commands 732 to the storage device 720 as part of a boot process for the host computer 710.

The storage device 720 comprises a storage device controller 722 and a storage medium 724. The storage device controller 722 is configured to receive requests to perform data access operations, and to perform the requested data access operations using a storage medium 724 and a cryptographic key 728. For example, a request to perform a data access operation can comprise a request to store data in the storage device 720. The storage device controller 722 can receive such a request, encrypt the data using the key 728, and write the encrypted data to the storage medium 724. For example, a request to perform a data access operation can comprise a request to retrieve data stored in the storage device 720. The storage device controller 722 can receive such a request, retrieve encrypted data identified by the request from the storage medium 724, decrypt the encrypted data using the key 728, and transmit the decrypted data to the host computer 710 in response to the request.

The storage device controller 722 is configured to receive the one or more initialization commands 732 and, responsive to the receipt of the initialization commands 732, to initialize the storage device 720 for use by the host computer 710. The storage device 720 comprises a host configuration record 726. The host configuration record 726 can comprise a manifest of hardware components of a host computer connected to the storage device 720. In at least one embodiment, the host configuration record 726 comprises a hash of a manifest of hardware components of the host computer.

As part of an initialization process of the storage device 720, the storage device 722 can use the host configuration record 726 to detect that the hardware configuration of the host computer 710 has changed and/or that the storage device 720 has been connected to a different host computer (e.g., 710) than the host computer to which the storage device 720 was previously connected. The detection can comprise transmitting a host configuration request 734 to the host computer 710. The host computer 710 can generate a host configuration record 736 based on the one or more hardware components 714 of the host computer 710, and can transmit the host configuration record 736 to the storage device 720. In at least one embodiment, the host configuration record 736 comprises a manifest describing the one or more hardware components 714. Additionally or alternatively, the host configuration record 736 can comprise a hash of a manifest describing the one or more hardware components 714.

The storage device controller 722 can receive the host configuration record 736 and compare it to the host configuration record 726 stored in the storage device 720. In a particular embodiment where the host configuration record 726 comprises a hash of a manifest of hardware components, the storage device controller 722 can generate a hash of the host configuration record 736 and compare the generated hash to the hash stored in the host configuration record 726. If the host configuration record 736 received from the host computer 710 does not match the host configuration record 726 stored in the storage device 720, the storage device controller 722 can perform a cryptographic erase operation to render data stored in the storage medium 724 unreadable by the host computer 710. In at least one embodiment, performing the cryptographic erase operation comprises deleting the cryptographic key 728. In a further embodiment, the storage device controller 722 can be configured to generate a new cryptographic key to be used to encrypt subsequent data written to the storage medium 724, and/or to replace the host configuration record 726 with the host configuration record 736 received from the host computer 710. In such an embodiment, the storage device 720 can appear to the host computer 710 as if it is an empty storage device.

Figure 8:
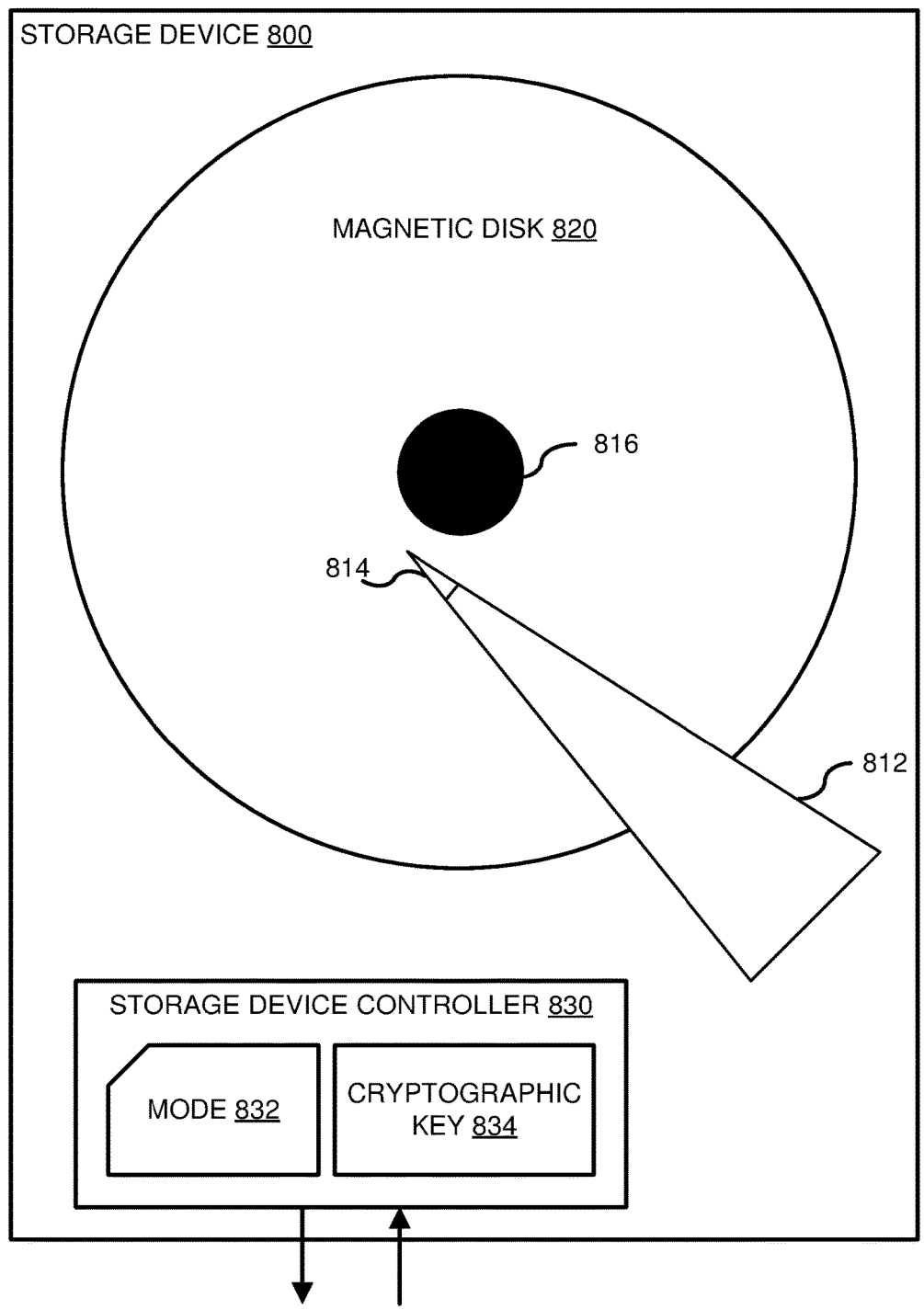
FIG. 8 is a system diagram depicting an example storage device configured to support a secure sanitization mode.

FIG. 8 is a system diagram depicting an example storage device 800 configured to support a secure sanitization mode. The example storage device 800 can be used as a storage device in any of the examples described herein.

The storage device 800 comprises a magnetic disk 820 that can be rotated on a spindle 816. The storage device 800 also comprises a moveable actuator arm 812 with a read/write head 814. The actuator arm 812 can be rotated on an actuator axis (not shown) by an actuator (not shown) to move the read/write head 814 over different portions of the magnetic disk 820. The storage device 800 is configured to write data to and to read data from the magnetic disk 820 using the read/write head 814. The read/write head 814 can comprise a single head that can perform both read and write operations. Alternatively, the read/write head 814 can comprise two separate heads for reading and writing, respectively. The storage device 800 can be configured to use the read/write head 814 to write data to the magnetic disk 820 in multiple concentric circular tracks as the magnetic disk is rotated on the spindle 816.

A storage device controller 830 can process write and read access commands sent to the storage device 800 to write data to and read data from the storage medium 820. The storage device controller 830 can specify a location on the magnetic disk 820 at which the data is to be written or from which the data is to be read. For example, each unit of data stored on the magnetic disk 820 can have a unique address, such as a block address and/or extent within a data block, which identifies the location on the magnetic disk 820 where it is stored.

The storage device controller 830 comprises a device mode 832 and one or more data management modules (not shown). The device mode 832 can represent various states of the storage device 800. For example, the device mode can represent an operational state, in which the storage device controller 830 can process data access operations to retrieve data from and write data to the storage medium 820. For example, the data management modules can comprise modules for operating the actuator arm 812, operating the spindle 816, and operating the read/write head 814. The storage device controller 830 can use the data management modules to process requested data access operations. In the operational state, the storage device controller 830 can be configured to use a cryptographic key 834 to encrypt data before it is written to the storage medium 820, and to decrypt data retrieved from the storage medium 820 before it is transmitted in response to a read access command. Additionally, in the operational state, the storage device controller 830 can be configured to reject requests to sanitize the storage device 800.

The device mode 832 can represent a sanitization state, in which requests to sanitize the storage device 800 can be processed. The storage device controller 830 can support a command to place the storage device 800 in the sanitization state. In at least one embodiment, the storage device controller 830 is configured to reject a command to place the storage device 800 in the sanitization state unless the command is received from a trusted source (such as a boot firmware of a host computer (not shown) connected to the storage device 800. In a different or further embodiment, the storage device controller 830 is configured to reject the command to place the storage device 800 in the sanitization state unless it is received by the storage device controller 830 during an initialization of the storage device 800. Processing the command to place the storage device 800 in the sanitization state can comprise updating a value of the mode 832.

While in the sanitization state, the storage device controller 830 can process a request to sanitize the storage device 800. Sanitizing the storage device 800 can comprise deleting the cryptographic key 834. In at least one embodiment, the storage device controller 830 is configured to reject read and write access commands while in the sanitization state. Once the storage device 800 has been returned to the operational state (for example, by rebooting the storage device 800 after the sanitization request has been processed), the storage device controller 830 will be unable to decrypt data stored on the storage medium 820 that was encrypted using the cryptographic key 834.

Figure 9:
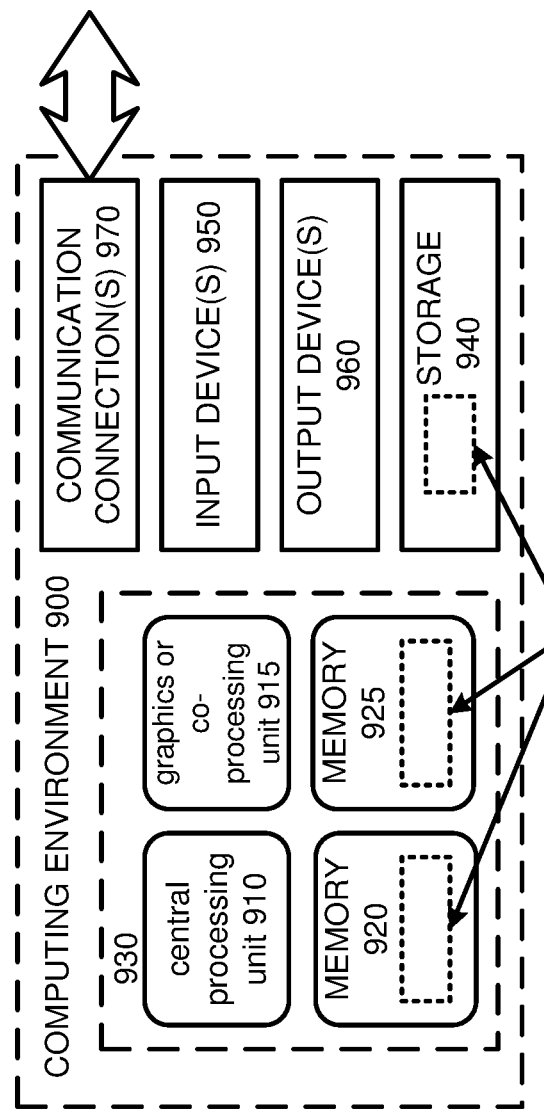
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

In at least some embodiments, the computing environment 900 can be a host computer or computing device as described herein.

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein. In some embodiments, storage 940 comprises one or more of the example storage devices as described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers. A computer-readable storage medium can be a storage device, as described herein.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We claim as our invention all that comes within the scope of the following claims.

What is claimed is:

1. A system for securely sanitizing a storage device, the system comprising:
   a storage device comprising a storage medium and a storage device controller, wherein the storage device controller is configured to:
   store data in the storage medium, wherein storing the data comprises encrypting the data using a cryptographic key,
   retrieve the data from the storage medium, wherein retrieving the data comprises decrypting the data using the cryptographic key,
   place the storage device in an operational mode, in which mode commands to delete the cryptographic key are rejected by the storage device,
   receive a command to place the storage device in a sanitization mode, in which mode commands to delete the cryptographic key are accepted by the storage device,
   determine that the command to place the storage device in the sanitization mode is authorized,
   place the storage device in the sanitization mode,
   receive a command to delete the cryptographic key, and
   delete the cryptographic key; and
   a host computing device connected to the storage device, wherein the host computing device is configured to:
   transmit data to the storage device controller to be stored in the storage medium,
   transmit requests to the storage device controller to retrieve the data stored on the storage medium,
   transmit the command to the storage device controller to place the storage device in the sanitization mode, and
   transmit the command to the storage device controller to delete the cryptographic key.

2. The system of claim 1, wherein:
   the host computer comprises a boot chip comprising a boot firmware configured to initialize the storage device and to transmit the command to place the storage device in the sanitization mode to the storage device controller during an initialization of the storage device; and
   the determining that the command to place the storage device the sanitization mode is authorized comprises determining that the command to place the storage device in the sanitization mode is received during the initialization of the storage device from the boot firmware.

3. The system of claim 2, wherein the boot firmware is further configured to:
   detect an activation of a physical switch connected to the host computing device; and
   transmit the command to place the storage device in the sanitization mode to the storage device controller responsive to the activation of the physical switch.

4. The system of claim 1, wherein the host computing device comprises a host bus adapter connected to the storage device.

5. The system of claim 1, wherein the storage device controller is configured to reject data access commands while the storage device is in the sanitization mode.

6. The system of claim 1, wherein the storage device controller is further configured to:
   detect a change in a configuration of hardware components of the host computer; and
   delete the cryptographic key responsive to detecting the change.

7. The system of claim 1, wherein the host computer is further configured to:
   detect an establishment of the connection between the host computer and the storage device; and transmit the command to place of the storage device in the sanitization mode responsive to the establishment of the connection between the host computer and the storage device.

8. A storage device, comprising:
a storage medium; and
a storage device controller, wherein the storage device controller is configured to:
  initialize the storage device in an operational mode, in which mode the storage device is configured to reject a command to cryptographically erase data stored on the storage medium;
  receive a command to place the storage device into a sanitization mode, in which mode the storage device is configured to accept the command to cryptographically erase data stored on the storage medium;
  authenticate the command to place the storage device in the sanitization mode;
  as a result of the authenticating, place the storage device in the sanitization mode;
  receive the command to cryptographically erase data stored on the storage medium while the storage device is in the sanitization mode; and
  cryptographically erase the data stored on the storage medium.

9. The storage device of claim 8, wherein the storage device controller is further configured to reject commands received subsequent to the processing of the command to cryptographically erase the data stored on the storage medium while the storage device remains in the sanitization mode.

10. The storage device of claim 8, wherein:
the storage device controller is further configured to accept the command to place the storage device in the sanitization mode only during a boot sequence of the storage device.

11. The storage device of claim 8, wherein the authenticating comprises determining that the command is received from a boot firmware of a computing device that is connected to the storage device.

12. The storage device of claim 8, wherein cryptographically erasing the data stored on the storage medium comprises erasing a cryptographic key stored on the storage medium that is used to decrypt the data stored on the computer-readable storage medium.

13. The storage device of claim 12, wherein:
cryptographically erasing the data stored on the storage medium further comprises generating a new cryptographic key; and
wherein the storage device controller is further configured to use the new cryptographic key to encrypt data subsequently written to the storage medium.

14. The storage device of claim 8, wherein the storage device controller is further configured to reboot the storage device after processing the command to cryptographically erase the data stored on the storage medium.

15. The storage device of claim 8, wherein the storage medium comprises a magnetic disk.

16. A method, comprising:
receiving a first request to perform an erase operation on data stored in a storage device;
determining that the storage device is not in a sanitization mode;
rejecting the first request;
receiving a request to place the storage device in the sanitization mode;
determining that the request to place the storage device in the sanitization mode is received from a requestor authorized to place the storage device in the sanitization mode;
placing the storage device in the sanitization mode;
receiving a second request to perform the erase operation on the data stored in the storage device; and
performing the erase operation on the data stored in the storage device with the storage device in the sanitization mode.

17. The method of claim 16, further comprising:
receiving a request to perform a data manipulation operation;
determining that the storage device is in the sanitization mode; and
rejecting the request to perform the data manipulation operation.

18. The method of claim 16, further comprising:
determining that the erase operation is complete; and
taking the storage device out of the sanitization mode.

19. The method of claim 18, wherein taking the storage device out of the sanitization mode comprises restarting the storage device.

20. The method of claim 16, wherein determining that the request to place the storage device in the sanitization mode is received from a requestor authorized to place the storage device in the sanitization mode comprises:
determining that the request to place the storage device in the sanitization mode is received from a boot firmware of a computing device connected to the storage device during a boot sequence of the storage device.

* * * * *